Dec. 4, 1956 E. A. ZIELINSKI 2,772,593

HARMONICA APPARATUS

Filed May 11, 1953 2 Sheets-Sheet 1

INVENTOR:
EDWARD A. ZIELINSKI
BY:
Wallace and Cannon
ATTORNEYS:

Dec. 4, 1956 E. A. ZIELINSKI 2,772,593

HARMONICA APPARATUS

Filed May 11, 1953 2 Sheets-Sheet 2

INVENTOR:
EDWARD A. ZIELINSKI
BY:
Wallace and Cannon
ATTORNEYS:

2,772,593

HARMONICA APPARATUS

Edward A. Zielinski, Berwyn, Ill., assignor of one-half to Joseph S. Kishel, Brookfield, Ill.

Application May 11, 1953, Serial No. 353,978

10 Claims. (Cl. 84—1.04)

This application is a continuation-in-part of my earlier application, Serial No. 238,461, filed July 25, 1951, now Patent No. 2,664,775 dated January 5, 1954.

This invention relates to harmonica apparatus and particularly to a holder unit which is adapted to hold an harmonica and an amplifier pickup therefor.

More particularly, this invention relates to a holder unit or casing in which a conventional harmonica may be removably mounted in position of use relative to an amplifier pickup also mounted in the holder unit or casing to the end that the complete assembly may be held readily in the hands of the player and the music played upon the harmonica picked up and amplified by means of a conventional amplifier system associated with and electrically connected to the amplifier pickup.

An object of the invention is to provide a novel holder unit or casing which is adapted to hold an harmonica and an amplifier pickup associated therewith so that the harmonica may be played and the music produced thereby picked up and amplified by means of a suitable amplifier apparatus electrically connected with the amplifier pickup.

Another object of the invention is to provide a novel combination of an harmonica, amplifier pickup therefor, a holder unit or casing and novel retaining means adapted to be mounted within the holder casing for holding, at different times, harmonicas of different sizes and lengths within the holder casing.

An additional object of the invention is to construct and arrange the novel retaining means in such a manner that the positions of the harmonica holder clips embodied therein may be changed or released so as to hold, at different times, harmonicas of varying and different lengths or sizes.

Other and further objects of the present invention will be apparent from the following description and claims and are illustrated in the accompanying drawing which by way of illustration, shows a preferred embodiment of the present invention and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

Figure 1:
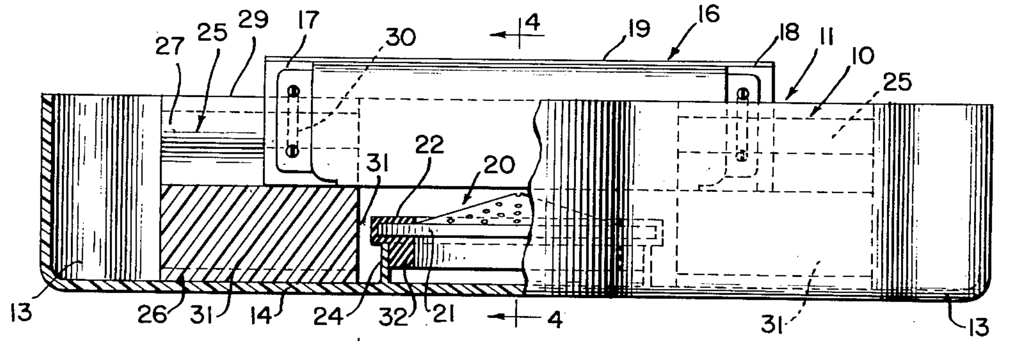
Fig. 1 is an elevational view of the new harmonica holder unit, portions of one wall thereof being broken away to reveal the structure thereof, an harmonica and amplifier pickup being shown as being mounted in position of use therein, and the harmonica retaining means being arranged in position to hold a relatively short or small harmonica in position of use in the holder casing.
Figures 2, 3, 4, 5:
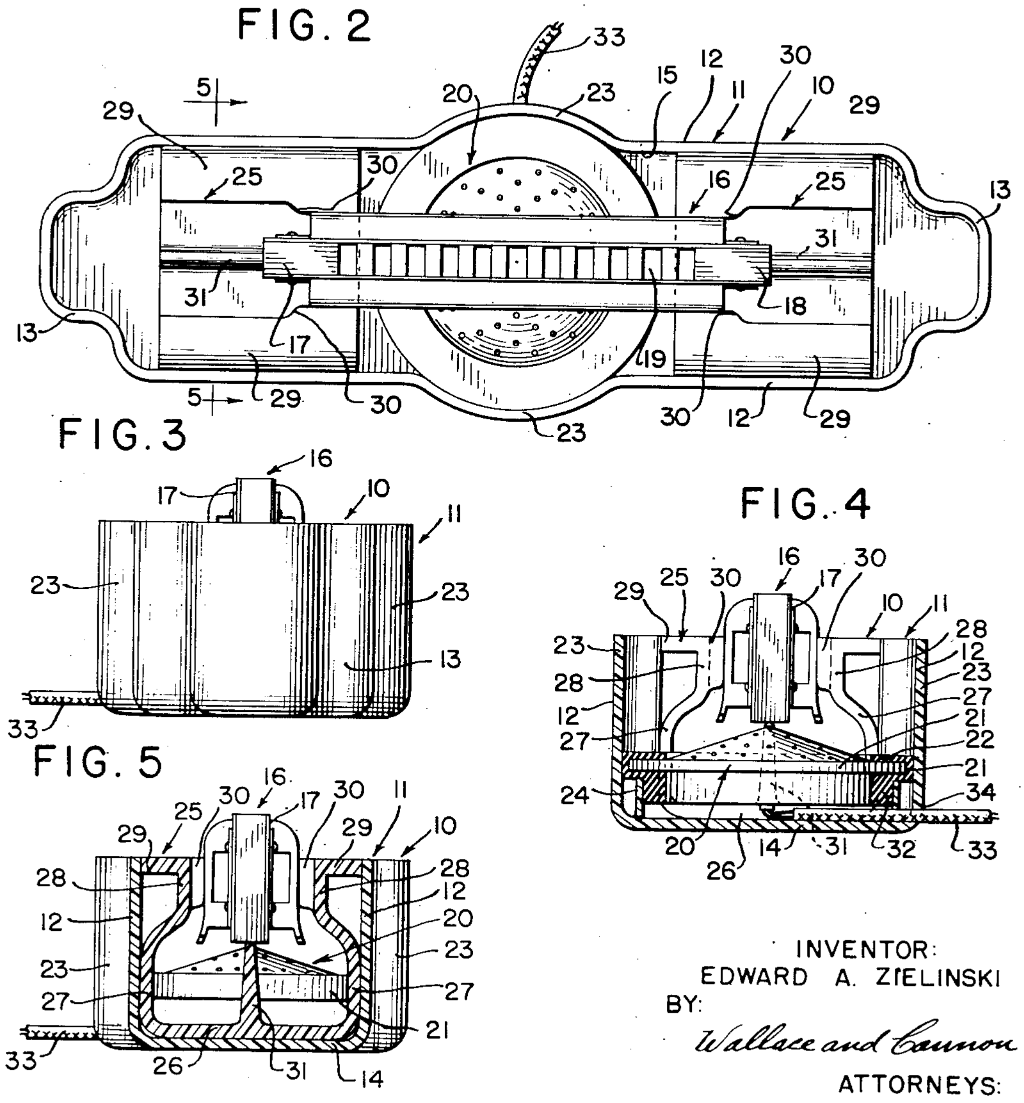
Fig. 2 is a top plan view of the new harmonica holder unit, illustrating the parts shown in Fig. 1.
Fig. 3 is an end elevational view of the harmonica holder unit shown in Figs. 1 and 2.
Fig. 4 is a transverse vertical sectional view on line 4—4 in Fig. 1, showing the arrangement of the harmonica and amplifier pickup in the new harmonica holder unit.
Fig. 5 is a transverse vertical sectional view on line 5—5 in Fig. 4.

A preferred embodiment of the new harmonica unit is illustrated in the drawings, wherein it is generally indicated at 10, and comprises an elongated and generally rectangular-shaped holder unit in the form of a holder casing or housing 11, which may be made of any suitable material such, for example, as any suitable synthetic plastic resinous material, or of light metal, such as aluminum, or the like. The holder casing 11 includes spaced generally parallel side walls 12, spaced outwardly flared end walls 13, and a bottom wall 14, the housing or casing 11 having an open top or throat 15, Fig. 2, for the reception of an harmonica, which is generally indicated at 16, and which includes an elongated body having spaced end portions 17 and 18 and a playing face 19. The holder casing or housing 11 is also adapted to receive and to hold an amplifier pickup, which is generally indicated at 20 and which embodies an annular-shaped body 21 on which a resilient rubber or like resilient ring 22 is removably mounted. (Figs. 1 and 4.)

As shown in the drawings, each of the side walls 12 of the holder casing 11 has an outwardly flared boss portion 23 formed centrally therein between the ends thereof, for a purpose which will be described presently.

The bottom wall 14 of the holder casing 11 has an upwardly extending generally annular-shaped rib 24 formed therein and this upwardly tending generally annular-shaped rib 24 is concentric with the outwardly flared boss portions 23 of the side walls 12 for a reason which will be explained presently.

The new harmonica apparatus includes novel retaining means for holding, at different times, in the holder casing 11, harmonicas of varying sizes and lengths. To this end the novel harmonica retaining means of the present invention includes a pair of similar harmonica-holding clips 25, one of which is shown in detail in Figs. 8 to 11, inclusive, of the drawings, and which may be made of synthetic plastic resinous material, or of light metal, such as an aluminum alloy, or the like. Each of the harmonica holding clips 25 includes a bottom wall 26, a pair of upright spaced side walls 27 each having an upwardly flared upper end portion 28 terminating in an outwardly flared flange portion 29 (Figs. 8 to 11, inclusive). Each of the outwardly flared top flange portions 29 has a boss or inwardly extending portion 30 formed therein and each harmonica holder clip 25 has an upwardly extending central rest or supporting rib portion 31 formed therein.

In order to amplify the music produced by the harmonica 19, an amplifier microphone pickup unit 20 may be mounted in the well or receptacle provided therefor by the upwardly extending generally annular rib 24 on the bottom wall 14 of the holder casing 11 and the outwardly flared portions 23 of the side walls 12 of the holder casing 11 which cooperate to form a receptacle or well for the reception of the amplifier pickup unit 20. When the parts are so arranged the resilient rubber or like ring 22 is slightly compressed and frictionally engages and grips the generally annular-shaped rib or wall 24, in the radially inner surface of the latter (Fig. 4), while also engaging the outwardly flared central portions 23 of the side walls 12 of the holder casing 11. To this end the resilient clamping ring 22 has an annular flange 31 formed therein with the body 21 of the microphone pick-up unit 20 (Fig. 4) and it also has a depending annular skirt portion or flange 32 which projects downwardly inside of and frontwardly engages the annular rig 24 (Figs. 1 and 4).

Thus it will be seen that the generally annular-shaped rib 24 and the resilient rubber or like ring 22 provide a means for removably holding the generally annular-shaped body 21 of the amplifier pickup unit 20 centrally in the holder casing 11 and between the inner side of the harmonica 19 and the bottom wall 14 of the holder casing 11.

Figure 6:
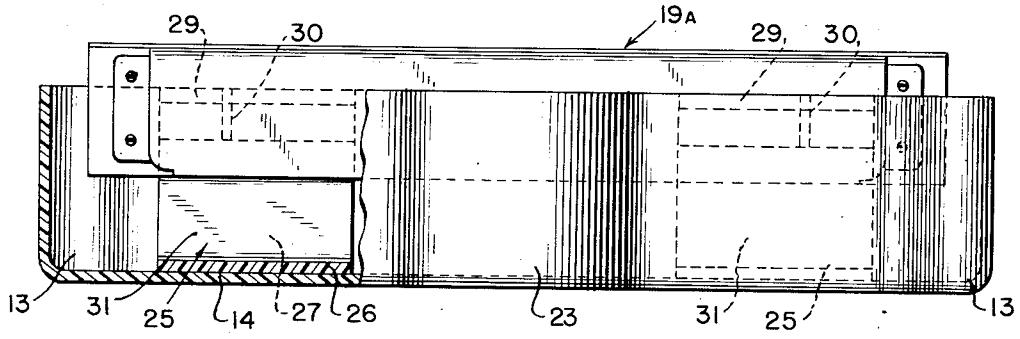
Fig. 6 is a side elevational view, with part of the wall of the new harmonica holder casing broken away, and showing the new harmonica retaining means being arranged to hold a relatively longer and larger harmonica in the holder casing than is shown in Figs. 1 to 5 inclusive.
Figures 7, 8, 9, 10, 11, 12:
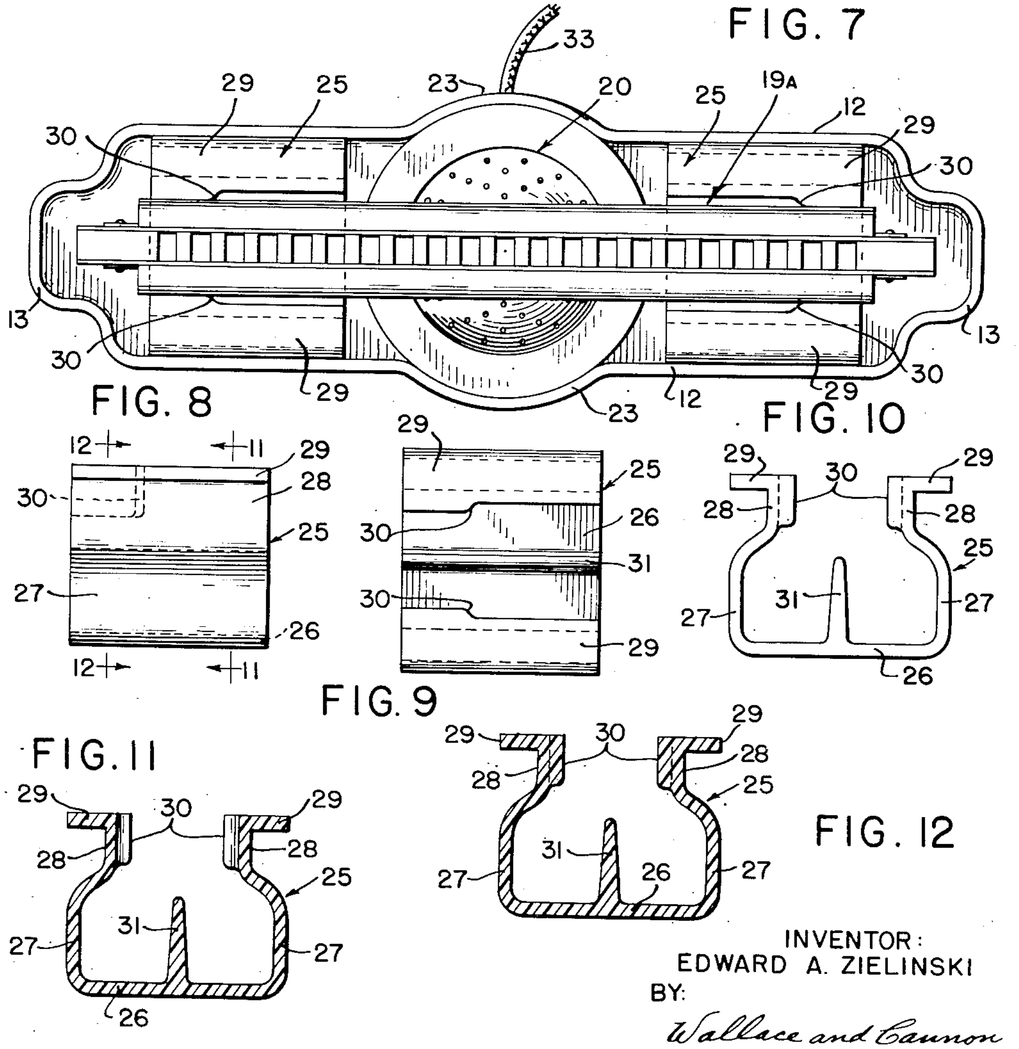
Fig. 7 is a top plan view of the new harmonica holder unit shown in Fig. 6.
Fig. 8 is a side elevational view of one of the harmonica holding clips embodied in the present invention.
Fig. 9 is a top plan view of one of the harmonica holding clips shown in Fig. 8.
Fig. 10 is an end elevational view of one of the harmonica holding clips shown in Fig. 9.
Fig. 11 is a sectional view on line 11—11 in Fig. 8.
Fig. 12 is a sectional view on line 12—12 in Fig. 8.

In the use of the new harmonica apparatus the novel harmonica retaining means or clips 25 may be arranged selectively to hold either a relatively short or smaller harmonica 19, as shown in Figs. 1 to 5, inclusive, of the drawings, or a relatively larger and longer harmonica 19*a*, as shown in Figs. 6 and 7.

Thus, in order to hold a relatively shorter and smaller harmonica 19, as in Figs. 1 to 5, inclusive, the harmonica holder clips 25 are arranged in the holder casing 11, between the side walls 12 thereof, as shown in Figs. 1 to 5, inclusive, with the bottom wall 26 of each clip 25 resting on the bottom wall 14 of the holder casing and with the side walls 22 of each holder clip 25 abutting the inner surface of each side wall 12 of the holder casing 11, and with the inwardly projecting flanges or bosses 30 which are formed on the top flanges 29 of the holder clips 25, arranged at the inner ends of the holder clips 25, relative to the holder casing 11, so as to provide a pair of relatively narrow or restricted throats for the reception of the end portions 17 and 18 of the harmonica 19.

It will be noted that when the harmonica 19 is in position of use in the holder casing 11 it projects centrally and longitudinally through the casing 11 with the bottom thereof extending across and above the apex of the body 26 of the microphone pickup unit 20 and with the playing face of the harmonica 19 projecting outwardly of the body of the holder casing 11, through the open throat 15 thereof, so that the playing face of the harmonica is readily accessible to the player.

To assemble the new harmonica apparatus or unit 10 the amplifier microphone pickup 20 may be readily mounted in the receptacle or well provided by the generally annular-shaped rib 24 and the outwardly flared portions 23 of the side walls 12 of the casing by forcing the resilient clamping ring 22—31 downwardly, upon the generally annular-shaped rib 24, until the upper edge portion of the rib 24 engages under the annular flange 31 formed in the clamping ring 22 and so that the skirt 32 of the clamping ring 22 extends downwardly inside of and is slightly compressed within and frictionally engages the inner surface of the generally annular-shaped rib 24.

In order to mount the relatively shorter and smaller form of harmonica 19, shown in Figs. 1 and 2, in the new holder casing 11, the retaining clips 25 are positioned in the holder casing 11 in the manner which is illustrated in Figs. 1, 2, 4 and 5, of the drawings with the bottom wall 26 of each holder clip 25 resting on the bottom wall 14 of the holder casing 11 and with the outer surface of the side walls 27 and the outer surfaces of the laterally extending flanges 29 of the holder clips 25 bearing against and frictionally engaging the inner surfaces of the main extent of the side walls 12, and with the laterally inwardly extending flanges or bosses 30 being arranged at the inner ends of the retaining clips 25. When the parts are thus arranged the harmonica 19 may be assembled in position of use by slipping the end portions of the body thereof downwardly between the inwardly extending lateral flanges 30 of the holder clips 25, with the playing face of the harmonica disposed upwardly, until the bottom surface of the harmonica 19 contacts and bears upon the upwardly extending ribs 31 of the retaining clips 25, whereupon the flanges 30 of the retaining clips 25 frictionally engage the body of the harmonica and hold the same in position of use in the holder casing 11.

When it is desired to employ a relatively larger and longer harmonica 19*a* (Figs. 6 and 7) in the new holder casing 11 the position of the retaining clips 25 in and relative to the holder casing 11 may be reversed so that the laterally inwardly extending flanges 30 are arranged or positioned at the outer ends of the retaining clips 25, relative to the holder casing 11, as shown in Figs. 6 and 7, whereupon the relatively longer and larger harmonica 19*a* may be mounted in position of use as hereinbefore described in connection with the mounting of the relatively smaller and shorter harmonica 19.

When it is desired to disassemble the new harmonica apparatus or unit 10 this may be readily accomplished by merely withdrawing the harmonica 19 or 19*a* from the body of the holder casing 11, through the open throat 15 thereof, removing the retaining clips 25, and then merely withdrawing the yieldable rubber or the like clamping ring 22 from the receptacle or well provided by the generally annular-shaped rib 24 and the outwardly flared portions 23 of the side walls 12 of the holder casing 11.

When the parts are arranged as shown in the drawings, the amplifier pickup unit 20 is disposed immediately below and centrally of the harmonica 19 or 19*a* and the amplifier pickup unit 20 may be electrically connected by a suitable conductor 33, and jack, not shown, to any suitable amplifier unit and loud speaker therefor, such, for example, as the loud speaker of a radio receiver apparatus, or the like. To this end the electrical conductor cord 33 extends through an opening 34 formed in one wall 12 of the holder casing 11, adjacent the bottom wall 14 (Fig. 4).

When the assembled holder casing 11, harmonica 19 or 19*a*, and amplifier unit 20 are held in the player's hands and played the musical sounds emanating from the harmonica 19 or 19*a* will be picked up by the amplifier or microphone pickup unit 11 and amplified in the form of electrical pulsations carried by and through the conductor 33 to a suitable loud speaker, not shown.

It will thus be seen from the foregoing description, considered in conjunction with the accompanying drawings, that the present invention provides a novel harmonica unit for an harmonica and amplifier microphone or pickup therefor, and a novel combination of an harmonica holder casing, harmonica and amplifier microphone or pickup, and novel means for removably holding or retaining the harmonica in the holder casing, having the desirable advantages and characteristics, and accomplishing their intended objects, including those hereinbefore pointed out and others which are inherent in the invention.

I claim:

1. A holder unit for an harmonica and amplifier therefor comprising an elongated casing including spaced side walls, end walls, and a bottom wall, and the said casing having an open throat for the reception of an harmonica removably mounted therein, spaced retaining means in the said holder casing for removably retaining an harmonica therein, and means arranged within the said holder casing between the said spaced retaining means for mounting an amplifier microphone pickup within the said holder casing and between the bottom wall of the said holder casing and an harmonica mounted therein.

2. A holder unit as defined in claim 1 in which the said retaining means includes a pair of retaining clips removably mounted in the said holder casing and adapted to frictionally grip an harmonica to hold the same in the said holder casing.

3. A holder unit as defined in claim 1 in which the said retaining means includes a pair of retaining clips each insertable into the said holder casing and adapted to be removably held therein by frictional engagement with the side walls of the said holder casing.

4. A holder unit as defined in claim 1 in which the said retaining means includes a pair of retaining clips each insertable into the said holder casing and adapted to be removably held therein by frictional engagement with the side walls of the said holder casing, and in which each of said retaining clips is generally U-shaped in form and includes a pair of spaced laterally inwardly extending gripping flanges adapted to frictionally grip the body of an harmonica at the sides thereof.

5. A holder unit as defined in claim 1 in which the said retaining means includes a pair of retaining clips each insertable into the said holder casing, and adapted to be removably held therein by frictional engagement with the side walls of the said holder casing and in which each of said retaining clips is generally U-shaped in form and includes a pair of spaced laterally inwardly extending gripping flanges formed integrally with the side walls thereof, and on the inner surfaces and at the top of said side walls, and adapted to frictionall grip the body of an harmonica on the outer sides thereof for retaining the said harmonica in the said holder casing.

6. A holder unit as defined in claim 1 in which the said retaining means includes a pair of retaining clips each insertable into the said holder casing, and each adapted to be removably held therein by frictional engagement with the side walls of the said holder casing and in which each of said retaining clips is generally U-shaped in form and includes a pair of spaced laterally inwardly extending gripping flanges formed integrally with the side walls thereof and on the inner sides and at the top of the said side walls of said retaining clips, and adapted to frictionally grip the body of an harmonica at the sides thereof, and which each of said retaining clips includes an upwardly extended supporting rib formed centrally on the bottom wall thereof and projecting upwardly therefrom and adapted to engage the bottom surface of the body of an harmonica engaged by said gripping flanges.

7. A holder unit as defined in claim 1 in which the said bottom wall of said casing has an upwardly extending and generally annular-shaped rib formed therein, and in which each of the said side walls of said casing has an outwardly flared portion formed therein, and in which said outwardly flared portions of the said side walls of said casing cooperate with said generally annular-shaped rib to provide a well for the reception of an amplifier pickup at the bottom of the said holder casing and between the bottom wall of said holder casing and an harmonica mounted therein.

8. Harmonica apparatus comprising, in combination, a holder unit embodying an elongated casing including spaced generally parallel side walls, end walls, and a bottom wall and said casing having an open throat, an harmonica removably mounted in the said holder casing and having its playing face projecting outwardly of the said holder casing through the said open throat thereof, and an amplifier microphone pickup mounted in the said holder casing between the said bottom wall of the said holder casing and said harmonica mounted therein.

9. Harmonica apparatus as defined in claim 8, in which the said holder casing includes means providing a well for the reception of the said amplifier microphone pickup.

10. Harmonica apparatus as defined in claim 8, in which the said holder casing includes means providing a well for the reception of the said amplifier microphone pickup, and in which the said harmonica apparatus includes resilient means cooperating with the said means providing said well for frictionally and releasably clamping said amplifier microphone pickup to and upon the said means providing the said well.

References Cited in the file of this patent

UNITED STATES PATENTS

| | | |
|---|---|---|
| 780,862 | Cameron | Jan. 24, 1905 |
| 2,565,100 | Tate | Aug. 21, 1951 |
| 2,574,591 | Rudd | Nov. 13, 1951 |